United States Patent [19]
Shelton et al.

[11] 3,845,812
[45] Nov. 5, 1974

[54] APPARATUS FOR MANUFACTURING SHEET-CUTTING FEMALE DIES

[75] Inventors: Winston L. Shelton, Jeffersontown; Joseph L. Newman, Louisville, both of Ky.

[73] Assignee: Quik Die, Inc., Jeffersontown, Ky.

[22] Filed: May 10, 1973

[21] Appl. No.: 359,138

Related U.S. Application Data

[62] Division of Ser. No. 133,853, April 14, 1971, Pat. No. 3,756,308.

[52] U.S. Cl. ............................................. 164/335
[51] Int. Cl. ............................................. B22d 41/04
[58] Field of Search .......... 164/122, 125, 126, 128, 164/135, 137, 335, 338, 339, 340, 341, 342, 164/343, 348, 266, 258, 50, 51

[56] References Cited
UNITED STATES PATENTS 575,115    1/1897    Hunt ............................. 164/348 X
2,289,484  7/1942    Coley ............................. 164/335
3,519,063  7/1970    Piearcey ......................... 164/353
3,601,179  8/1971    Taylor ........................... 164/258 X

FOREIGN PATENTS OR APPLICATIONS 1,214,359  4/1966    Germany ......................... 164/335

Primary Examiner—J. Spencer Overholser
Assistant Examiner—John E. Roethel
Attorney, Agent, or Firm—William E. Sherwood

[57] ABSTRACT

A compact apparatus for use in the manufacture of sheet-cutting female dies includes a cabinet having an assembly of melting and casting pots with associated heating and progressive cooling means governed by an electrical control system. A method for manufacturing the die in a comparatively short time as contrasted with conventional machining methods, is disclosed.

3 Claims, 7 Drawing Figures

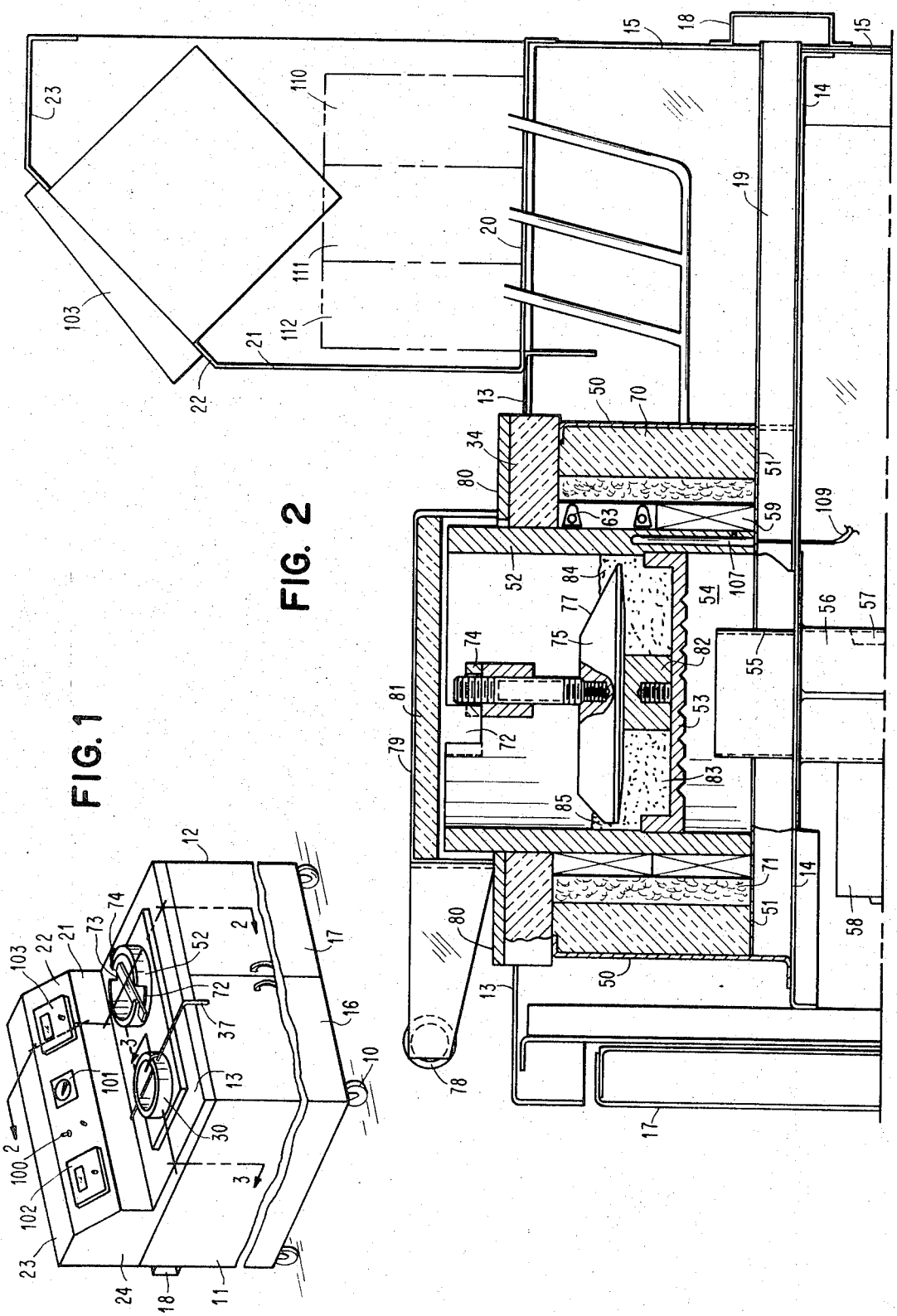

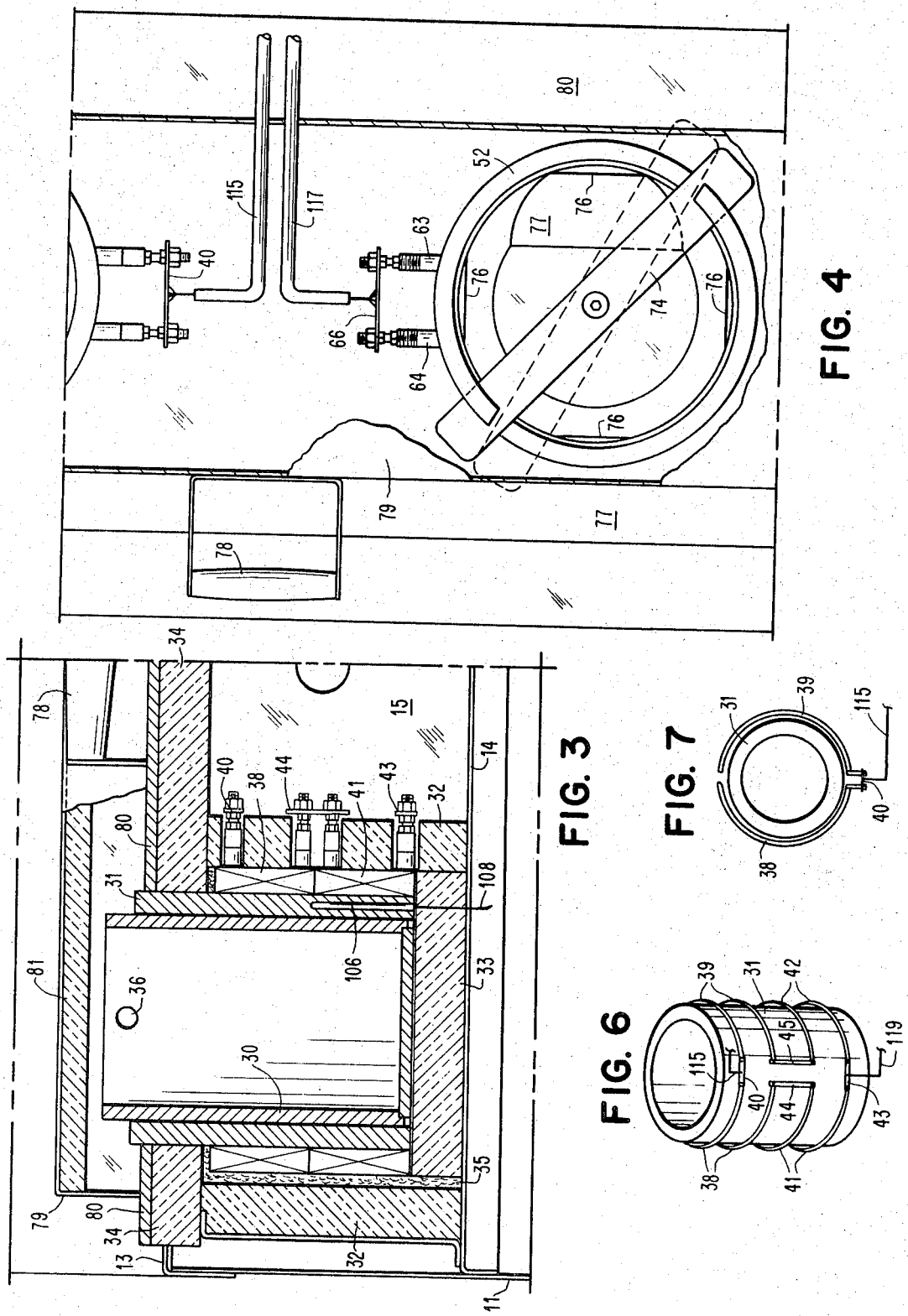

3,845,812

APPARATUS FOR MANUFACTURING SHEET-CUTTING FEMALE DIES

This is a division of application Ser. No. 133,853, filed Apr. 14, 1971, now U.S. Pat. No. 3,756,308.

BACKGROUND OF THE INVENTION

The manufacture of high-quality female dies to be used with a punch, or male dies, in a press for forming apertures in sheet material, has long been recognized as a time consuming and expensive procedure. When such die is to be made by machining techniques involving drilling and inside cuts many hours of time by an expert machinist may be required. Also, when the female die is to be cast and then allowed to cool with proper crystal growth and with accurate dimensions of the finished die, exacting supervisory demands are placed upon the operator who performs the casting step and controls the rate of cooling. Not only must a highly skilled operator be employed, but also a need exists for appropriate, labor-saving apparatus which that operator may employ in the die manufacturing process.

It is, therefore, a purpose of the present invention to employ a method and apparatus which will overcome disadvantages of the above described nature as presently found in the die manufacturing art.

SUMMARY

Apparatus used in accordance with the invention comprises a casting pot or mold, with its side selectively heated by upper and lower resistance heaters and with its bottom exposed to a controlled source of cooling air. A detachable die plate defining the upper face of the cast die is positioned in the casting pot and holds a male die in contact with the bottom of the pot, and around which male die the melt is poured through apertures at the periphery of the die plate. A selectively operable blower directs a stream of cooling air against the bottom of the pot to cause the melt in the pot to solidify progressively outward from the male die, and a timer controlled system deactivates the first and second heaters in sequence to cause the melt to solidify progressively upward from the bottom of the pot.

Preferably, the apparatus includes a cabinet supporting the casting pot and an adjacent melting pot together with an electrical system controlling the heat employed in both the melting and casting steps.

The method of the invention includes the positioning of the male die, with which the cast female die will later cooperate in a sheet-cutting press, within a mold space, and the subsequent casting of the female die in that space. The progressive solidification of the hot female die is conducted in the presence of a supply of residual flowable melt so that contraction of the solidifying melt material is compensated by continued introduction of flowable melt into the mold space. Following the formation of the female die, the two dies are removed from the casting apparatus and are then separated from each other.

Among the objects of the invention are the provision of an improved method of forming female sheet-cutting dies in a rapid and economical manner; the provision of an improved method for selectively controlling the solidification and crystallization of a metallic female die during its casting; the provision of an improved apparatus for casting female dies; the provision of a compact apparatus having a melting pot and a casting pot located conveniently near each other and with readily accessible controls for operating the melting and casting operations; and the provision of an improved electrical control system for governing the heating of a melting pot and of an adjacent casting pot mounted in a cabinet containing the control system.

These and other objects and advantages of the invention will become more apparent as the description proceeds and when considered in conjunction with the accompanying drawings in which:

FIG. 1 is a perspective view of the cabinet with the pot cover removed.

FIG. 2 is a sectional view of the upper portion of the cabinet taken on line 2—2 of FIG. 1.

FIG. 3 is a sectional view of the melting pot taken on line 3—3 of FIG. 1 and with the cover in place.

FIG. 4 is a plan view of a portion of the cabinet top with the die plate installed in the casting pot.

FIG. 6 is a perspective view of the melting pot bushing with the heaters in place, and FIG. 7 is a top plan view of the pot shown in FIG. 6.

Figure 5:
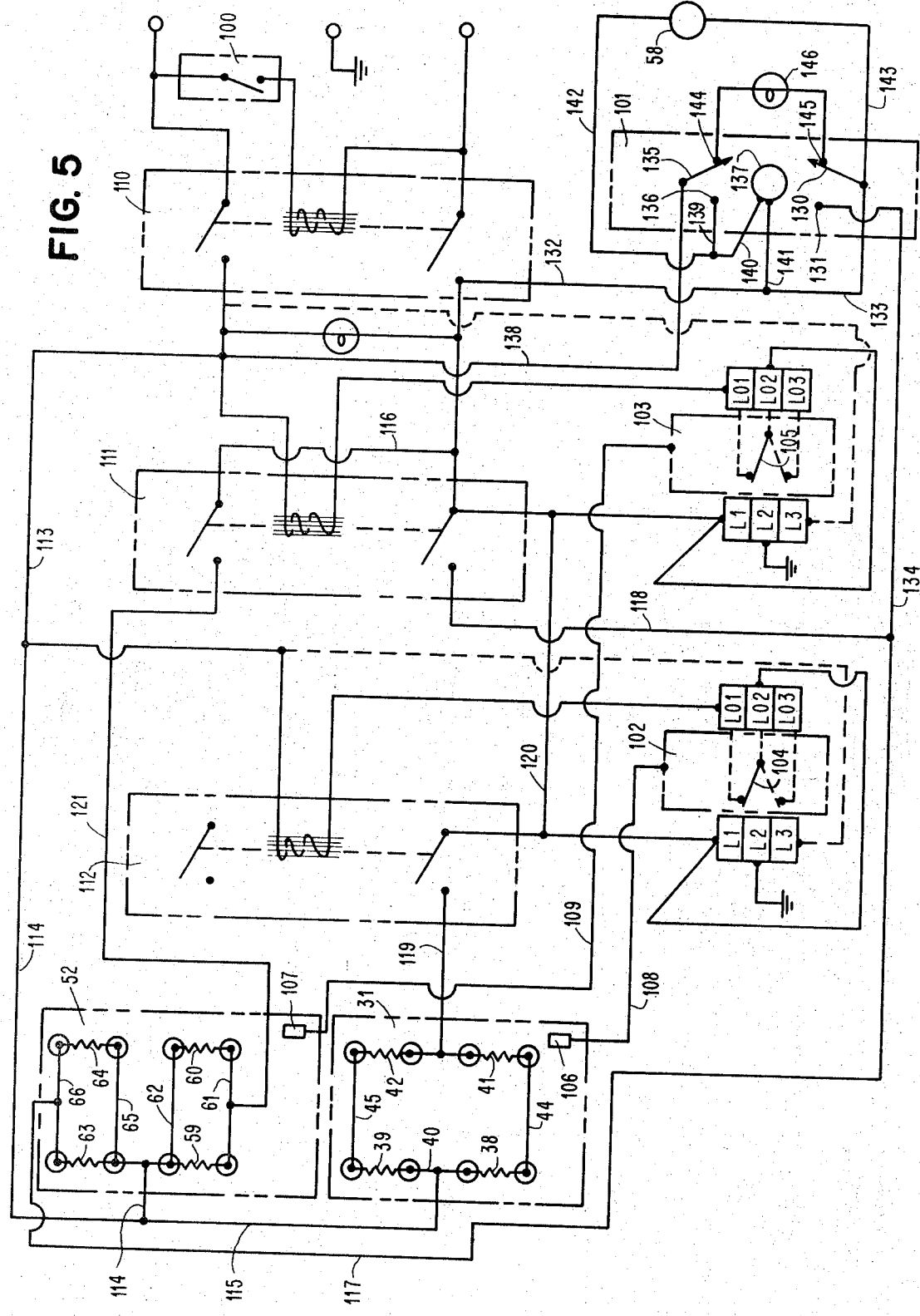
FIG. 5 is a schematic diagram of the electrical circuitry of the apparatus.

Referring first to FIG. 1, a compact cabinet preferably provided with casters 10 for portability, comprises a main housing having side walls 11, 12 to which is attached an apertured cover 13 at a convenient working height. An interior horizontal shelf 14 attached to the side walls and to a rear wall 15 provides a support for the pots and other elements later to be described. Hinged doors 16, 17 at the front of the cabinet provide access to the interior and at the rear a manifold 18 attached to the rear wall and extending to the sides of the cabinet serves to exhaust hot air entering that manifold from conduit 19 supported by the shelf. A supplementary housing for certain electrical control units includes a mounting plate 20 attached to the cover plate 13 and to the rear wall 15, and has a vertically extending portion 21 merging into an inclined panel portion 22 and thence into a top panel portion 23. This supplementary housing serves as a backsplash the rear of which preferably is open, and which is defined by end portions, one of which is shown at 24.

Passing now to FIGS. 3, 6 and 7, a metallic pot 30, formed of a metal which will withstand high temperatures and without alloying with the melt material employed, preferably is of circular cross section and fits with a small clearance into a stationary metallic tubular bushing 31 having resistance heaters, later to be described, attached to its outer periphery. Surrounding these heaters is a tube 32 of heat insulating material supported upon shelf 14; a disc 33 of similar insulating material being interposed between the shelf and the bottoms of pot 30 and of the bushing 31. In addition, an apertured slab 34 of similar insulating material rests upon the tube 32 in surrounding relation to the bushing 31. Space between the heating coils and the tube of insulation may conveniently be packed with loose insulation 35.

The top edge of the melting pot is formed with apertures 36 arranged above the top edge of the bushing and through which a manually operable tool 37 may be detachably secured for use in lifting and transporting the melting pot and its contents during the practice of the method steps of the invention. Various forms and arrangements of heaters may be employed, but we prefer to use a heater such as the Chromalox type HBT-50-65 available from Edwin L. Wregand Co., Pittsburgh, Pa. and arranged as indicated in FIGS. 6 and 7. As shown therein, a pair of U-shaped heaters 38, 39 bent into arcuate form corresponding to the outer periphery of the bushing 31 forms the heat source for the upper section of the melting pot and are connected at one terminal by a horizontal bar 40 to which conductor 115 extends. A pair of similar heaters 41, 42 forms the heat source for the lower section of the melting pot and are connected at one terminal by a horizontal bar 43 to which conductor 119 extends. Vertical bars 44, 45 connect the other terminals of heaters 38 and 41 and of heaters 39 and 42, respectively.

As shown in FIG. 2, a tubular sleeve 50 having an internally disposed horizontal plate 51 with a central aperture therein is attached to the upper side of shelf 14 and has a side aperture through which the conduit 19 extends. Supported upon the plate 51 is the end of a tubular wall of casting pot or mold 52 which in conjunction with a bottom portion 53 forms a mold space. This pot 52 and its bottom 53 are formed of a metal which will withstand high termperature and without alloying with the melt material. Significantly the lower surface of the bottom 53 is indented to assume greater heat transfer surface while the upper surface of the bottom portion is smooth. Alternately, heat radiating fins may be attached to the central part of bottom 53 to provide a heat sump. Immediately below the casting pot a substantial space 54 is provided and into which space a nozzle 55 from a blower casing 56 is directed. This casing is supported from the lower face of shelf 14 and includes an intake 57 communicating with the interior of the cabinet. The casing also houses an impeller driven by a motor 58. Relatively cold air emerging from nozzle 55 abstracts heat from the bottom of the pot near the center of the pot to assist in the progressive cooling of the cast female die from its center outwardly, and the thus heated air then is vented into the manifold by means of conduit 19.

Attached to the outer face of pot 52 are plurality of heaters of the type employed with the melting pot, but arranged as indicated in FIG. 5. In this arrangement the heaters 59, 60 at the lower portion of the pot have one terminal thereof connected to a bar 61 to which conductor 121 extends, whereas the other terminal thereof is connected to a bar 62 to which conductor 114 extends. The heaters 63, 64 at the upper portion of pot 52 have one terminal connected by bar 65 to which the conductor 114 also extends. One other terminal of heaters 63, 64 is connected to a bar 66 to which conductor 117 extends. Accordingly, as will later appear, both the upper and lower sections of the casting pot may be heated simultaneously in preparation for the casting step and thereafter the upper section may continue to be heated while the lower section is cooling and effecting a progressive solidification of the cast female die from the bottom upwardly.

Disposed within the sleeve 50 is a tube 70 of heat insulating material and with the space between this tube and the heaters being filled with loose insulation 71. The slab 34 of heat insulating material which surrounds the melting pot also surrounds the casting pot and is disposed above the heaters 63, 64. The upper end of the casting pot wall extends above the top 13 of the cabinet and is provided with diametrically opposed slots 72, 73 (FIG. 1) into which a pull bar 74 may be selectively engaged or disengaged.

As a significant feature, a die plate, or mold cover, 75 adjustably affixed to the pull bar and adapted for insertion into the casting pot with a small clearance, for example about 0.01 inch, is formed with one or more, and preferably four symmetrically spaced, cut-away portions 76 at its periphery. The upper surface of this die plate also is inclined downwardly toward the periphery of the plate as indicated at 77. When this die plate is installed in the casting pot and heat is being applied by the heaters, a manually adjustable cover for the pots as indicated in FIGS. 2 and 4 may be used to retain heat and to shield the operator. Such a cover includes a handle 78 attached to a casing 79 having a downwardly directed wall which rests upon a suitable sheet 80 of protective material for preventing damage to the slab 34 of insulation. On the interior of this cover a slab 81 of heat insulating material is secured thus to confine heat being radiated from the described pots.

The method steps of the invention include not only the automatically controlled cooling of the female die cast in pot 52 but also the steps preparatory to such casting as now to be described. Accordingly, the male die or punch 82, with which the female die will later be used in a press, is first positioned upon the bottom plate 53 of the mold and the die plate 75 is clamped thereagainst with the pull bar 74 locked in the slots 72, 73. The male die will be formed of a metal, such as steel, having a smaller coefficient of expansion than the metal, such as a zinc-based alloy, comprising the female die.

Assuming the melting pot 30 to contain the requisite amount of molten metal at a suitable temperature for example about 800° F.; the casting pot 52 to be heated to the appropriate temperature, for example about 820° F.; and the circuits to the heaters and the blower to be interrupted, the operator is ready to proceed with the casting step. Pot 30 and its melt are lifted by means of tool 37 and tipped to pour the flowable melt upon the inclined surface of die plate 75 whereupon the melt flows through the cutaway portions 76 and fills the space below the die plate as indicated by the strippled body 83. Sufficient flowable melt is present at this time to form a reservoir above the plate as indicated by the strippled sprues 84, 85 (FIG. 2). Having thus made the pour the operator restores the melting pot to normal position and then sets the timer in the circuit now to be described.

Referring to FIG. 5 showing a preferred form of circuitry for the electrical elements of the described apparatus, certain circuits are indicated in dotted lines to show the optional use of a 240 volt power source. Mounted upon the panel portion 22 of the cabinet is a manually operable main switch 100, an adjustable timer 101 (which conveniently may be the Cramer Type 271A-2-60 timer availabe from Conrac Corp., Old Saybrook, Conn.) and a pair of controllers 102 and 103 (which conveniently may be the Fenwal Model 524 available from Walter Kiddle Co., Ashland, Mass.) for the melting and casting posts respectively. As will be understood, these controllers include internal switches 104, 105 respectively, whose positions are controlled by the manual setting of the controllers to a predetermined maximum heating of the pots, and by temperature sensing probes 106, 107 mounted in those pots and connected to the controllers by conductors 108, 109. Conventional relays 110, 111 and 112 incorporated in the circuit may conveniently be mounted on the plate 20 of the cabinet as seen in FIG. 2.

In initiating a typical operation as partially described above, the operator after having loaded the melting pot with melt material and having secured the male die and die plate in the casting pot, and having set the controllers 102 and 103 to a desired heat reading, then closes the main switch 100 which energizes relay 110 as long as that switch is closed. Preferably the cover is in place over the pots at this time. As switch 100 closes, a circuit is made energizing relay 110 and since the controller switches 104, 105 are now set to their solid line positions, relays 111 and 112 also are energized. Through conductors 113, 114, 121, relay 111 and conductor 116, the lower heater in the casting pot is now energized and through conductors 117, 118 and relay 111 the upper heater in the casting pot is likewise energized. Also, through conductors 115, 119, relay 112, conductor 120 and relay 111, both heaters in the melting pot are energized. At this time, of course, the timer 101 and blower motor 58 are deenergized.

During the heating period which may, for example, be about one hour, the operator may perform other duties while occasionally noting the dials of the controllers. When, therefore, the probes 106 and 107 indicate that the appropriate temperatures have been reached, the operator returns the controllers to their zero reading causing switches 104 and 103 to move to their dotted line positions and deenergizing relays 112 and 111. The cover is then removed and the above-described pour of the melt into the casting pot then is made, and then after the timer 101 is set to a selected time, for example one hour, and is energized by closing the timer switch. As this occurs the internal cams of the timer cause blade 130 to move into contact with terminal 131 and to establish a circuit through conductors 132, 133, blade 130, contact 131, conductors 134, 117, upper heaters 63, 64 of the casting pot, and conductors 114 and 113.

At the same time the timer blade 135 is moved into contact with terminal 136 and a circuit to the timer motor 137 is made through conductors 138, blade 135, terminal 136, conductors 139, 140, motor 137, and conductors 141, 132. A shunt circuit also is made through conductor 142, blower motor 58, and conductors 143, 133, and 132. Thus, the blower motor will now continue to run until the blade 135 is shifted into contact with terminal 144 and regardless of the shifting of blade 130 which controls the upper heater in the casting pot.

As a significant feature, when the blower motor is energized air is directed through the nozzle 55 (FIG. 2) against the central bottom portion of pot 52 and the cooling and subsequent selectively controlled crystallization of the hot melt as it solidifies will take place progressively from the center of the female die 83 in an outward direction, from the embedded male die, and at the same time such cooling progressively takes place in an upward direction since the lower heaters 59, 60 of the casting pot are deenergized and the upper heaters 63, 64 thereof are now producing heat. Contraction of the female die 83 toward the emplaced male die 82 thus occurs while a reservoir of molten melt is still present above the die plate 75 serving to compensate for shrinkage of the cooling lower portion of that female die. As will be understood, the molten metal above plate 75 is free to pass through the symmetrically spaced apertures 76.

In general, this formation of the female die can be completed in about thirty minutes at which time the internal cams of the timer cause blade 130 to shift into contact with terminal 145 meanwhile leaving blade 135 in contact with terminal 136 and permitting the blower motor to continue running. When blade 130 is so shifted the circuit to the upper heaters 63, 64 of the casting pot is interrupted and that pot and its contents are then permitted to cool to a suitable handling temperature, for example about 200° F.

Thereafter, at the time selected by the operator the timer blade 135 is shifted again into contact with terminal 144 interrupting the circuit to the timer motor 137 and establishing a circuit through light 146. When this light appears, the operator then opens main switch 100 and removes the pull bar 74, attached plate 75, cast female die 83 and embedded male die 82 from the casting pot.

These elements are then disassembled, any melt remaining as sprues 84, 85 is removed, and the male die is forced from the female die. Due to the difference in coefficient of expansion of the male and female die materials this removal of the male die may include a sufficient reheating of the female die by any suitable means, not shown, to cause a slight expansion of the female die material prior to pushing the male die therefrom. While this procedure is being followed, the apparatus may now be in its preparatory heating stage for making the subsequent female die.

Having thus described the method of practicing the invention and the combination of coordinated apparatus by means of which it may be practiced, it will be understood that the invention may also be embodied in other forms without departing from the scope of the appended claims.

What is claimed is:

1. Apparatus for casting female cutting dies comprising, a compact cabinet having an apertured interior shelf providing a horizontal supporting surface, a stationary open-top casting pot supported on said surface and having its bottom exposed to a cooling space within said cabinet above the aperture in said shelf, a conduit communicating said space with the exterior of said cabinet, a blower mounted in said cabinet below said shelf for forcing air through the aperture in said shelf into said space and thence into said conduit, a motor for driving said blower, an open-top melting pot detachably mounted on said shelf surface adjacent said casting pot and adapted to be manually moved for pouring its contents into said casting pot, heat-insulation surrounding the side walls of each of said pots, a stationary heat-insulated apertured cover sheet for said cabinet disposed above said shelf and with the upper ends of each of said pots extending above said cover sheet whereby melt material may be poured from the melting pot into the casting pot and the cast die may be removed from the casting pot without disturbing the positioning of the casting pot, an electrical heating means for said casting pot, an electrical heating means for said melting pot and electrical circuit means housed in said cabinet for controlling the operation of said motor, said heating means for said melting pot, and said heating means for said casting pot.

2. Apparatus as defined in claim 1 wherein said casting pot heating means includes a portion disposed at the upper section of the casting pot and a portion disposed at the lower section of the casting pot, said circuit means being adapted for energization of each of said portions simultaneously and for selective energization of the upper portion alone.

3. Apparatus as defined in claim 1 wherein said melting pot heating means includes a portion disposed at the upper section of the melting pot and a portion disposed at the lower section of the melting pot, said circuit means being adapted for energization of each of said portions simultaneously and for deenergization of each of said portions simultaneously.

* * * * *